US006910856B2

(12) United States Patent
Ruelke

(10) Patent No.: US 6,910,856 B2
(45) Date of Patent: Jun. 28, 2005

(54) RUN-IN COATING FOR AXIAL-FLOW COMPRESSOR OF GAS TURBINE ENGINES AND METHOD OF USING AND MAKING SAME

(75) Inventor: Kai Ruelke, Berglern-Niederlern (DE)

(73) Assignee: MTU Aero Engines GmbH, Munich (DE)

( * ) Notice: Subject to any disclaimer, the term of this patent is extended or adjusted under 35 U.S.C. 154(b) by 3 days.

(21) Appl. No.: 10/667,130

(22) Filed: Sep. 22, 2003

(65) Prior Publication Data
US 2004/0134067 A1 Jul. 15, 2004

(30) Foreign Application Priority Data

Sep. 21, 2002 (DE) .......................................... 102 44 038

(51) Int. Cl.[7] .............................................. F01D 11/12
(52) U.S. Cl. ................................ 415/173.3; 415/173.5; 277/355; 277/922; 277/923; 29/888.3
(58) Field of Search ........................... 415/173.3, 173.5, 415/174.2, 174.5, 230, 231; 277/355, 922, 923; 29/888.3

(56) References Cited

U.S. PATENT DOCUMENTS

| 4,063,848 | A | | 12/1977 | Wiggins et al. | |
| 6,439,844 | B1 | * | 8/2002 | Turnquist et al. | 415/173.3 |
| 6,533,284 | B2 | * | 3/2003 | Aksit et al. | 277/355 |
| 6,547,522 | B2 | * | 4/2003 | Turnquist et al. | 415/173.3 |

FOREIGN PATENT DOCUMENTS

| DE | 23 44 666 | | 3/1974 | |
| JP | 58-143014 A | * | 8/1983 | 415/174.5 |
| JP | 59-505 A | * | 1/1984 | 415/174.5 |
| JP | 09 144 699 | | 6/1997 | |
| WO | WO 02/36950 | | 11/2001 | |

* cited by examiner

Primary Examiner—Christopher Verdier
(74) Attorney, Agent, or Firm—Crowell & Moring LLP

(57) ABSTRACT

Metal wire bundles are combined into brushes as a run-in coating for the axial-flow compressor stage of a gas turbine engine. The metal wire bundles are inserted into the basic material or are combined into brush segments that are inserted into corresponding recesses of the rotor housing.

20 Claims, 2 Drawing Sheets

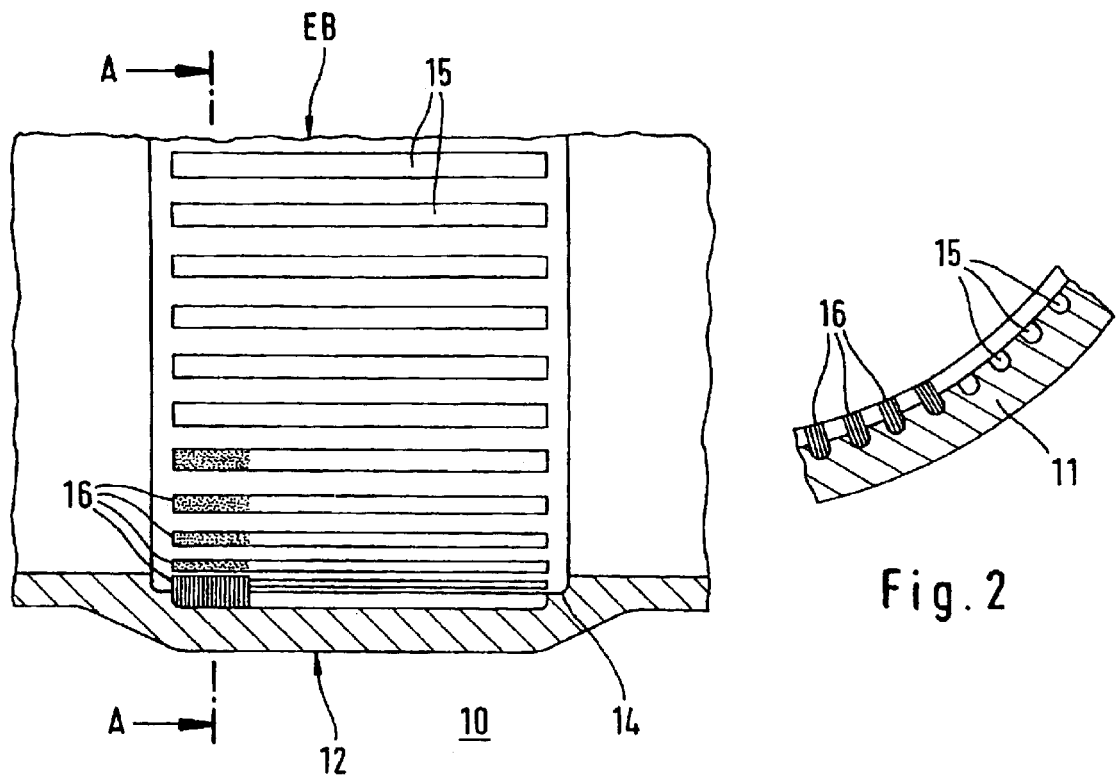
Fig. 1
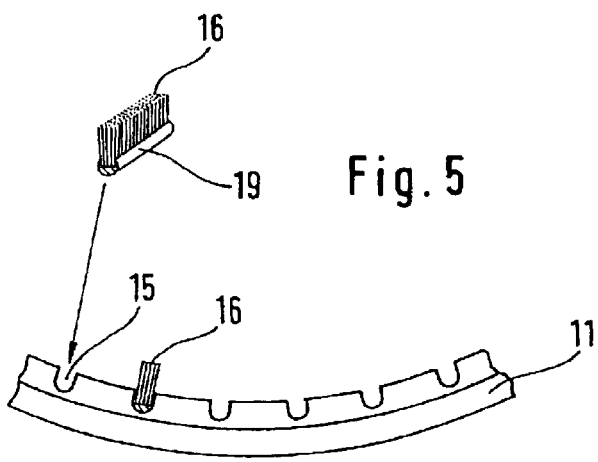
Fig. 2
Fig. 5
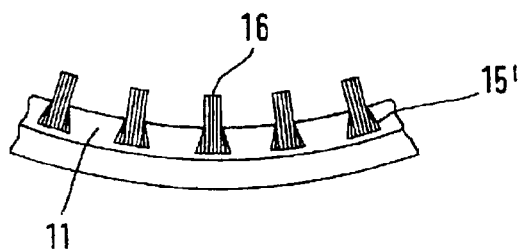
Fig. 4

RUN-IN COATING FOR AXIAL-FLOW COMPRESSOR OF GAS TURBINE ENGINES AND METHOD OF USING AND MAKING SAME

BACKGROUND AND SUMMARY OF THE INVENTION

This application claims the priority of 102 44 038.7-15 filed in Germany on Sep. 21, 2002, the disclosure of which is expressly incorporated by reference herein.

The invention relates to a run-in coating with metal wires bundles combined into brushes for an axial-flow compressor stage of a gas turbine, particularly a gas turbine engine, and to the methods of using and making of such a run-in coating.

As is generally known, such run-in coatings are used to minimize the operational gap between the stator and rotor of such axial-flow compressors. This involves significant complexity with respect to design, material and process.

The reasons for this are the different dynamic operational characteristics of the rotor and stator and their respective diameters. While the rotor diameters increase due to the centrifugal forces and thermal expansion, the housing diameters increase only due to thermal expansion. The time sequence in these dimensional changes differs between the rotor and the stator (housing). In addition, there are asymmetrical deflections of the rotor, e.g., when an aircraft equipped with the engine flies curves or loops and when the rotor moves axially during operation.

To minimize the gap deficit between stator and rotor, run-in coatings made of silicon have thus far been used. They are arranged in the interior of the stator in a housing indentation in the associated rotating blade area extending over the entire circumference of the stator. Thus, if the rotor is deflected as the aircraft equipped with the engine flies curves and/or ascends or descends, a running in of the rotor blades in said run-in coating is made possible without damaging the rotating blades, including the tips of the rotating blades.

From Patent Document No. WO 02/36950 A2 it is known to implement a run-in coating at least in some areas by means of brushes. Bristle bundles are configured and arranged in such a way that the free bristle ends form a more or less continuous "bristle carpet" that acts as the run-in coating. The bristle bundles diverge starting from their mounting areas toward their free ends. For a continuous "carpet" a plurality of bristles and bundles with great volume and weight is required. Overall, the design is very complex and costly.

German Patent Document No. DE 23 44 666 A relates to wire brush type steam seals. These are used to axially seal rotationally symmetrical, wavy rotors by means of wire rows or brushes. The wire rows or brushes extend in circumferential direction around the rotor. A plurality of axially spaced wire rows or brushes may be present. There is no information as to the use thereof as a run-in coating for rotating blades.

Axial-flow compressors of the described type, under operating conditions that do not meet the design point, i.e., in the partial load range, have a reduced surge limit. To compensate this negative effect and to shift the surge limit to ranges of reduced flow, special design measures—known as casing treatments among experts—are used today, which are provided in the housings and in the blade run-in area. Casing treatments with circumferential grooves as described in the Japanese Patent Publication No. JP 09-144699 A or U.S. Pat. No. 4,063,848 show a moderate gain in the surge limit and no loss in efficiency.

One embodiment of a casing treatment in a gas turbine engine not further described here is the arrangement of a certain number of circumferential radial grooves, also referred to as circumferential grooves or channels, having a specific depth, a specific width and a specific shape of the bottom of the groove in the silicon blade run-in coating with a specific position relative to the blade area.

Despite the relative softness of the silicon, it has been found in operation that damage occurs along the entry edge to the first circumferential groove of the run-in coating in the form of semicircular notches. This causes undesirable losses. Measurements have shown that changes in the all-round gap of the compressor on an order of magnitude of 0.1 mm already lead to a 1% loss in efficiency.

Thus, an object of the invention is to provide a novel run-in coating, which is sufficiently elastic to absorb radial rotor deflections and expansions, seals well, is relatively light, can be easily and cost-effectively produced and is suitable as a so-called casing treatment.

According to the invention, this object is attained by making the brushes strip-shaped, oriented at least predominantly in axial direction and distributed uniformly spaced apart around the circumference of the rotating blade area.

The brushes form a zebra-striped brush field having defined gaps.

According to a first preferred embodiment of the invention, metal wire bundles combined into brushes and facing the tips of the rotating blades with their free ends are inserted with their opposite ends directly into corresponding grooves of the stator (housing) enclosing the rotor.

According to a second embodiment of the invention, the grooves receiving the opposite ends of the metal wire bundles are arranged in brush segments that are held in a recess made all around in the stator (housing).

The grooves receiving the opposite ends of the metal wire bundles have preferably a dovetail-shaped cross-section and are filled with a heat-resistant resin after the wire bundles have been inserted.

As an alternative, the opposite ends of the metal wire bundles are each enclosed by bar-shaped holders associated with grooves having a corresponding cross-section for mounting the wire bundles by shrinking the holders into the basic material of the rotor or the brush segments.

According to a further feature of preferred embodiments of the invention, the metal wire bundles are made of superalloys, each including 50 metal wires per $mm^2$.

With the use of brushes according to the invention as a run-in coating for the axial-flow compressor stage of a gas turbine engine, notching along the entry edges of the run-in coating is prevented by the greater elasticity of the metal wire bundles that form the brushes. Since the elastic brush material always returns to the original orientation of the metal wire bundles, power losses of an engine after running in of the stator and rotor are avoided. Tests have shown that the run-in characteristics of such brush fields are better than those of run-in coatings made of silicon. Inspecting the adherence of the run-in coating on the rotor (basic housing material) is also simpler than in coatings made of silicon. Silicon run-in coatings are generally known to be produced by spraying. In this process it is not always possible to avoid so-called dents that occur probably as a result of tensile stresses after the silicon has cured and that cannot be tolerated. When such dents occur, the entire run-in coating must be redone. This implies, furthermore, that it is not possible to produce silicon run-in coatings in partial areas. The use of brushes made of metal wire bundles combined into zebra striped brush fields as a run-in coating now makes it possible to repair such run-in coatings in partial areas. It also makes it easier to clean the above-described grooves, a process that is necessary from time to time.

All of these advantages have the result that the run-in coatings according to the invention furthermore make it possible to increase the surge margin of the compressor stage without any power loss, i.e., that they act as a so-called casing treatment.

The invention will now be described in greater detail, by way of example, with reference to embodiments depicted more or less schematically in the drawing.

Other objects, advantages and novel features of the present invention will become apparent from the following detailed description of the invention when considered in conjunction with the accompanying drawings.

BRIEF DESCRIPTION OF THE DRAWINGS

FIG. 1 is a top view of a detail of a gas turbine engine in the region of the rotating blade area of the axial-flow compressor stage with grooves milled all around into the basic stator material for receiving a run-in coating consisting of bundles of metal wires that are combined into brushes, constructed according to a first preferred embodiment of the present invention;

FIG. 2 is a view from the left onto the end face of the milled grooves in a section taken along line A—A in FIG. 1 with brushes inserted in part;

FIG. 4 is a schematic view which shows the mounting of the opposite wire bundle ends of the brushes in grooves milled into the basic stator material constructed according to preferred embodiments of the invention, and FIG. 5 is a section view which shows the mounting of the opposite wire bundle ends in bar-shaped holders whose cross-sections correspond to those of the grooves receiving them, constructed according to certain preferred embodiments of the invention.

DETAILED DESCRIPTION OF THE DRAWINGS

Figure 3A:
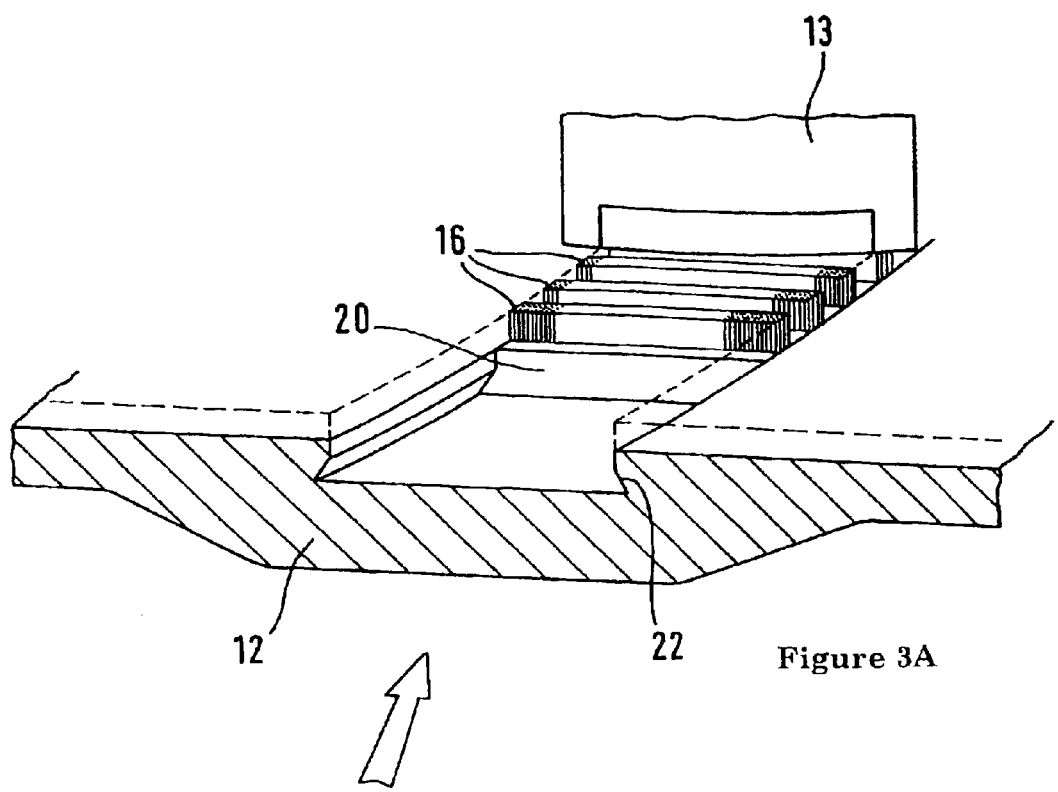
FIG. 3A is a partial schematic perspective showing a second embodiment of a run-in coating similar to FIG. 1 whose brushes are arranged in individual brush segments that are held in a corresponding stator recess extending around the stator.

FIG. 1 only shows a detail of the part associated with the rotating blade area 10 of an axial-flow compressor stage 11 of a gas turbine engine (not depicted) comprising at least one axial-flow compressor, a combustion device, a gas turbine and an exhaust nozzle. This region includes a stator 12 and rotor 13 (FIG. 3A). Indentation 14 of the stator 12 associated with the rotating blades of the axial-flow compressor stage is depicted in FIG. 1, and grooves 15 are milled all around into the basic material as shown in FIG. 2 to receive the run-in coating EB, which will be described below. The cross section of the grooves is either circular or dovetail-shaped depending on the mounting type of the run-in coating.

The run-in coating EB comprises metal wire bundles combined into brushes 16. The bundles are strip-shaped and with their free ends face the rotor 13, which is represented by a single rotor blade. With their opposite ends they engage with the aforementioned grooves 15' (FIG. 4)—which in this case are dovetail-shaped—where they are fixed by a heat-resistant resin that is cast into the grooves after the opposite bundle ends have been inserted, so that the brushes are bonded in.

Instead of bonding-in the brushes, they may also be shrunk into the groove. For this purpose, the strip-like combined wire bundles of such a strip-like brush are each enclosed at their opposite ends by a bar-shaped holder 19 (FIG. 5) whose cross section corresponds to the cross-section of the groove 15 receiving it. To be able to shrink these holders into the grooves, the material with the grooves must be heated and cooled again after the holders have been inserted. This results in a secure mounting of the holder and thus the brushes.

Figure 3B:
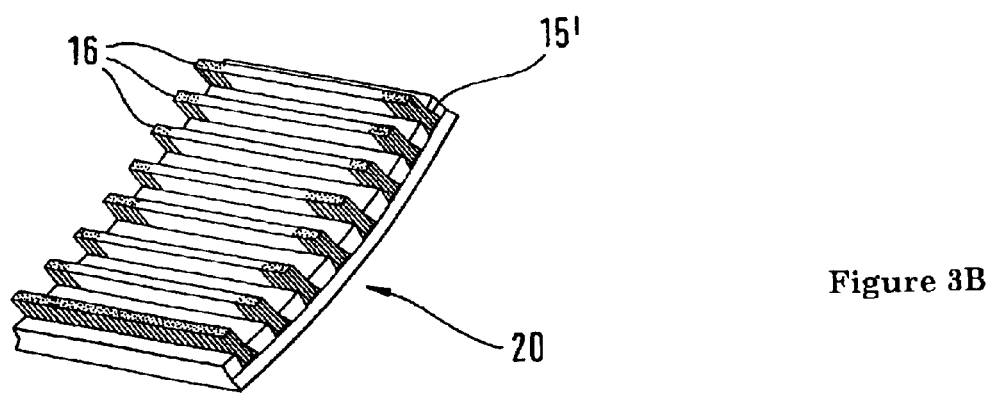
FIG. 3B is a perspective view of an individual brush segment of the FIG. 3A embodiment.

However, as shown in FIGS. 3A and 3B, the carriers of the grooves 15 may also be individual segments 20. These segments 20 are inserted into a recess 22, likewise extending all around in the stator, similarly to the blading of turbine stages, and are firmly held in their position with the aid of a segment lock (not depicted)—similar to the known blade locks. Approximately thirty of these segments are required to form a brush field that covers all around the rotating blade area of the axial-flow compressor stage.

As tests have shown, the use of superalloys for producing the metal wire bundles is particularly advantageous. The individual metal wires have a diameter of 0.14 mm, with 50 each combined per $mm^2$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A run-in coating with metal wire bundles combined into brushes for an axial-flow compressor stage of a gas turbine, particularly a gas turbine engine,
   wherein the brushes are strip-shaped, oriented at least predominantly in the axial direction and distributed uniformly spaced apart over the circumference of a rotating blade area of the axial-flow compressor stage so as to form a zebra-striped brush field.

2. A run-in coating as claimed in claim 1, wherein the metal wire bundles combined into brushes have free ends facing the rotor blade tips, these metal wire bundles are inserted with their opposite ends in corresponding uniformly distributed grooves made in the basic material of a stator that is associated with the rotor.

3. A run-in coating as claimed in claim 1, wherein grooves receiving opposite ends of the metal wire bundles are arranged in individual brush segments, which are held in a recess made all around in a stator.

4. A run-in coating as claimed in claim 1, wherein grooves receiving opposite ends of the metal wire bundles have a dovetail-shaped cross-section and are filled with a heat-resistant resin after the opposite ends of the metal wire bundles have been inserted.

5. A run-in coating as claimed in claim 1, wherein opposite ends of the metal wire bundles forming the brushes are enclosed by bar-shaped holders that are associated with grooves having a corresponding cross-section, wherein the holders are shrunk into the grooves.

6. A run-in coating as claimed in claim 1, wherein the metal wire bundles are made of superalloys, and their individual wires have a diameter of 0.14 mm, with 50 wires each being combined per mm².

7. A run-in coating as claimed in claim 2, wherein the metal wire bundles are made of superalloys, and their individual wires have a diameter of 0.14 mm, with 50 wires each being combined per mm².

8. A run-in coating as claimed in claim 3, wherein the metal wire bundles are made of superalloys, and their individual wires have a diameter of 0.14 mm, with 50 wires each being combined per mm².

9. A run-in coating as claimed in claim 4, wherein the metal wire bundles are made of superalloys, and their individual wires have a diameter of 0.14 mm, with 50 wires each being combined per mm².

10. A run-in coating as claimed in claim 5, wherein the metal wire bundles are made of superalloys, and their individual wires have a diameter of 0.14 mm, with 50 wires each being combined per mm².

11. A run-in coating as claimed in claim 1, wherein the run-in coating is used as a so-called casing treatment.

12. A gas turbine engine axial flow compressor assembly comprising:
   a compressor stator housing which in use surrounds a rotor with rotating blade tips facing a section of the stator housing wall, and
   a run-in coating provided at the section of the stator housing wall and including metal wire bundles anchored at the stator housing wall and forming brushes with free ends of the wires facing the rotating blade tips,
   wherein the brushes are strip shaped and extend in a longitudinal direction of the stator housing, said strip shaped brushes being distributed over the interior circumference of the stator housing with circumferential spacing between adjacent ones of said brushes.

13. An assembly according to claim 12, wherein the brushes are anchored directly in grooves formed in the material of the stator housing wall.

14. An assembly according to claim 13, wherein the grooves have a dove-tail shaped cross-section and are filled with a heat resistant resin after insertion of the wire bundles forming the brushes.

15. An assembly according to claim 12, wherein the wire bundles are fixed to bar-shaped holders, and
   wherein the bar-shaped holders are inserted in grooves in the stator housing wall.

16. An assembly according to claim 15, wherein the bar-shaped holders accommodate a single strip of wire bundles forming a brush.

17. An assembly according to claim 15, wherein the bar-shaped holders have a plurality of grooves accommodating respective strips of wire bundles forming brushes.

18. A method of making the assembly of claim 12, comprising:
   forming longitudinally extending grooves in the stator housing wall, and
   anchoring the wire bundles in the grooves.

19. A method according to claim 18, wherein said anchoring includes filling the grooves with a heat resistant anchoring resin after insertion of the wire bundles in said grooves.

20. A method according to claim 18, wherein said wire bundles forming a strip are first attached to a bar-shaped holder and then said bar-shaped holders are inserted in respective ones of said grooves.

* * * * *